United States Patent [19]

Miki et al.

[11] Patent Number: 4,473,899
[45] Date of Patent: Sep. 25, 1984

[54] PICKUP CARRIAGE TRANSPORTING MECHANISM FOR A DISK RECORD PLAYER AND METHOD FOR MANUFACTURING THE SAME

[75] Inventors: Tatsuya Miki, Sagamihara; Takashi Saito, Ayase; Tooru Kishi, Zama, all of Japan

[73] Assignee: Victor Company of Japan Limited, Yokohama, Japan

[21] Appl. No.: 357,544

[22] Filed: Mar. 15, 1982

[30] Foreign Application Priority Data

Mar. 20, 1981 [JP] Japan .......................... 56-39571[U]

[51] Int. Cl.³ ............................................. G11B 3/38
[52] U.S. Cl. .............................. 369/244; 369/77.2; 369/219; 369/249; 16/102
[58] Field of Search ............... 369/75, 77, 215, 216, 369/217, 219, 220, 221, 223, 224, 225, 226, 244, 249, 255; 16/102, 98, 107, DIG. 41

[56] References Cited

U.S. PATENT DOCUMENTS

| | | | |
|---|---|---|---|
| 3,787,925 | 1/1974 | Dawson | 16/107 |
| 4,139,200 | 2/1979 | Iyeta | 369/249 |
| 4,191,381 | 3/1980 | Stave | 369/215 |
| 4,323,997 | 4/1982 | Kuribayashi et al. | 369/219 |
| 4,342,109 | 7/1982 | Stewart | 369/77.2 |
| 4,346,467 | 8/1982 | Souther | 369/249 |

FOREIGN PATENT DOCUMENTS 2098377  11/1982  United Kingdom ............... 369/77.2

*Primary Examiner*—Steven L. Stephan
*Attorney, Agent, or Firm*—Pollock, VandeSande & Priddy

[57] ABSTRACT

In a pickup carriage transporting mechanism for a disk record player, such as a video disk player, a stopper made of a plate like member having a U-shaped recess is provided to correct the attitude of the carriage. The carriage is arranged to move left and right so that the stylus of the pickup moves linearly to pick up information from a disk on a turntable. Since the carriage is pulled at its front end by a loop-like wire to effect the leftward and rightward movement, the carriage is apt to be inclined from a desired angle. When the carriage is returned to its resting position, the front wall portion of the carriage will be partially received in the U-shaped recess having a width which is equal to or slightly greater than the thickness of the front wall portion so that inclination of the carriage is forcibly corrected by the stopper. Attitude correction will provide smooth loading and unloading of a disk because of accurate alignment of a plurality of sections of a guide rail used for insertion and removal of a disk casing. A non-threaded nut made of an elastic synthetic resin may be used to minimize the play of the guide roller.

14 Claims, 9 Drawing Figures

PICKUP CARRIAGE TRANSPORTING MECHANISM FOR A DISK RECORD PLAYER AND METHOD FOR MANUFACTURING THE SAME

BACKGROUND OF THE INVENTION

This invention relates generally to a pickup carriage transporting mechanism for a disk record player, such as a video disk player, and more particularly, the present invention relates to such a mechanism used for transporting the pickup carriage linearly radially with respect to a turntable.

Various types of video disk players are known, and in some known video disk players, a pickup used for deriving video and/or audio information is arranged to move linearly radially with respect to the center of a disk placed on the turntable. Particularly, in a known video disk player, the pickup having a stylus is held in a casing mounted on a movable carriage. The carriage is arranged to move along the stationary chassis of the player in such a manner that the carriage moves linearly. To this end the carriage is movably held at its front and rear portions, and is driven at the front or rear portion so that the carriage, and therefore, the pickup moves left and right when viewed from the front of the player.

However, since the carriage carrying the pickup is driven at its one end, i.e. at its front or rear portion, the carriage is apt to incline. Such inclination of the carriage is apt to result in trouble in the loading and unloading operation of a disk, in case the disk is arranged to be loaded by inserting a disk casing into the player. In detail, in a known video disk player, a disk casing having a disk therein is inserted through a front opening of the player so that the disk casing engages with a disk casing opening mechanism which slides along guide rails provided at the left and right sides of the turntable. The right guide rail is divided into a plurality and one piece of the divided sections of the right guide rail is disposed on a side wall portion of the carriage. Loading and unloading of a disk are effected only when the pickup is positioned at its resting position because all the divided sections of the right guide rail must be aligned to form a straight guide rail so that the disk casing opening mechanism is capable of sliding along the left and right guide rails. Although no problem would occur if all the divided sections of the right guide rail are aligned to form a straight guide rail, the movable section of the right guide rail, which section is attached to the side wall portion of the carriage, is apt to incline when the carriage is in its resting position because the carriage is driven by receiving a tensile force at only the front or rear portion of the carriage.

When alignment of the divided sections of the right guide rail is not achieved, trouble is apt to occur such that the disk casing cannot be inserted fully, or the disk casing inserted cannot be taken out.

SUMMARY OF THE INVENTION

The present invention has been developed in order to remove the above-described problem inherent to the conventional pickup carriage transporting mechanism for a disk record player.

It is, therefore an object of the present invention to provide a pickup carriage transporting mechanism for a disk record player with which the inclination of the carriage carrying the pickup is corrected when the carriage returns to its resting position so that the divided sections of one of a pair of guide rails for guiding a disk casing opening mechanism are aligned to form a straight guide rail.

Another object of the present invention is to provide a pickup carriage transporting mechanism for a disk record player and a method of manufacturing the same, with which the guide rollers have negligibly small play in the axial direction thereof so that the pickup carriage does not move in a direction normal to the direction of the linear movement thereof.

A further object of the present invention is to provide a pickup carriage transporting mechanism for a disk record player with which the carriage is capable of performing linear movement even if the attitude of the carriage is slightly inclined when a driving force is applied.

A still further object of the present invention is to provide a pickup carriage transporting mechanism for a disk record player with which a driving wire for pulling the pickup carriage is prevented from being disengaged due to slack.

In accordance with the present invention there is provided a pickup carriage transporting mechanism for a disk record player, comprising: first means for moving said carriage in one of opposite directions; and second means for correcting the attitude of said carriage when said carriage moves toward a predetermined position.

In accordance with the present invention there is also provided a method of manufacturing a pickup carriage transporting mechanism for a disk record player, which mechanism having at least one guide roller arranged to rotate along a guide rail, said guide roller being rotatably supported by a shaft which is fixedly attached to said carriage, said shaft having a threaded portion, said method comprising the steps of: attaching a guide roller to said stationary shaft; forcibly engaging an engineering plastic nut with said threaded portion of said shaft so that said nut will be self tapped; tightening said nut by rotating the same in a given direction; and loosening said nut by rotating the same in a direction opposite to said given direction so that said guide roller can readily rotate.

BRIEF DESCRIPTION OF THE DRAWINGS

The objects and features of the present invention will become more readily apparent from the following detailed description of the preferred embodiments taken in conjunction with the accompanying drawings in which.

The same or corresponding elements and parts are designated at like numerals throughout the drawings.

DETAILED DESCRIPTION OF THE INVENTION

Prior to describing the preferred embodiments of the present invention, a conventional video disk player will be described with reference to FIG. 1 for better understanding of the present invention.

Figure 1:
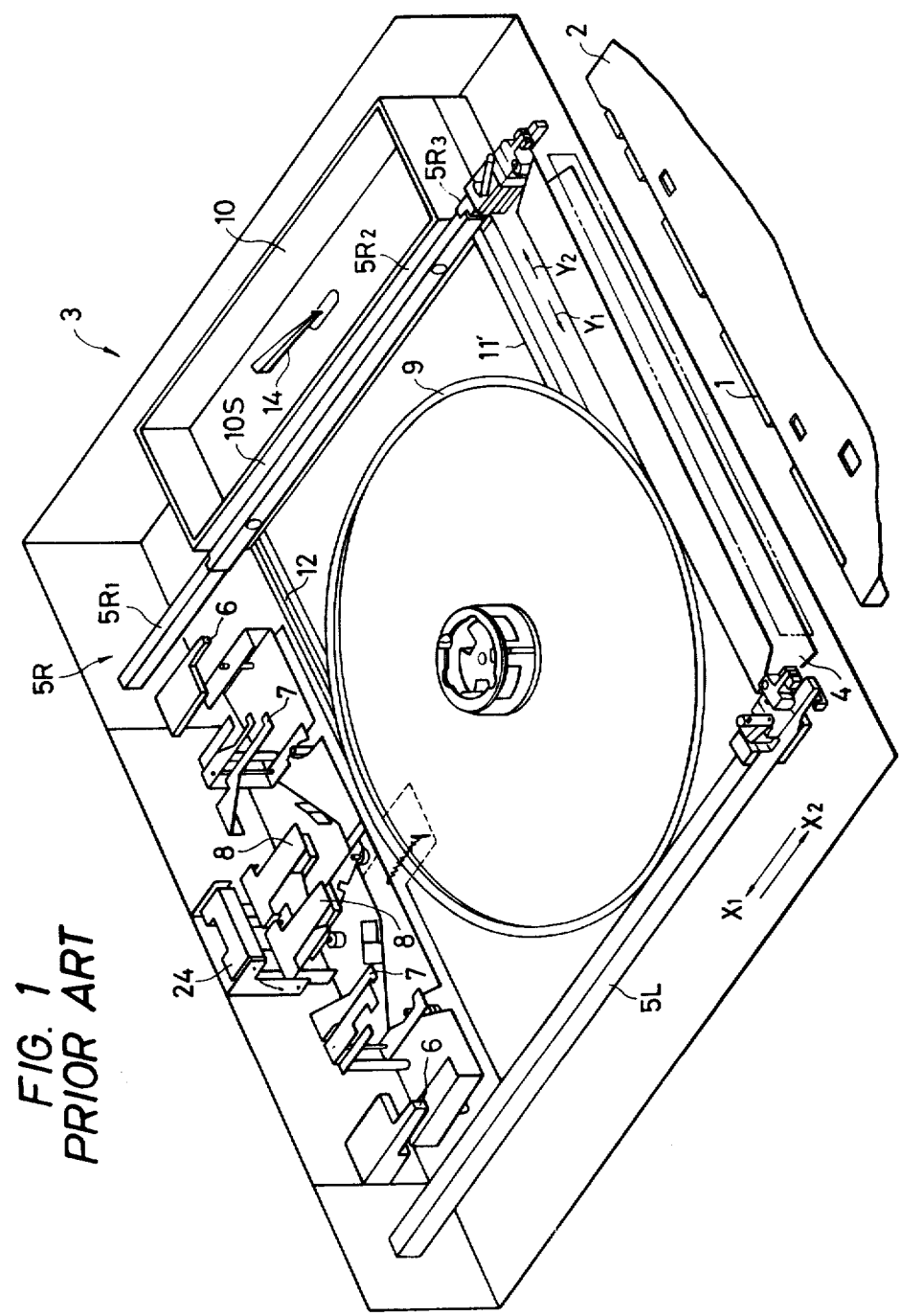
FIG. 1 is a perspective view of the inside of a conventional video disk player.

FIG. 1 is a perspective view of the inside of a known video disk player arranged to reproduce video and/or audio information from a disk. A disk (not shown) is received in a casing 2 having a front lid 1 and a body, and is arranged to be inserted into the inside of a video disk player 3 together with the casing 2. The video disk player 3 comprises an opening at its front so that the disk casing 2 can be inserted therethrough. An opening mechanism 4 is provided to open the front lid 1 of the disk casing 2 when being engaged therewith. When loading the disk received in the casing 2, the casing 2 is inserted through the front opening of the player 3 so that the front lid 1 of the casing 2 engages with the opening mechanism 4. The opening mechanism 4 is arranged to slide along right and left guide rails 5R and 5L which are arranged in parallel on both sides of a turntable 9. Although the left guide rail 5L is made of a single straight member, the right guide rail 5R is made of three sections 5R1, 5R2 and 5R3. The first and third sections 5R1 and 5R3 of the right guide rail 5R are stationary with respect to the chassis 35 of the player 3, while the second section 5R2 which is shown to be interposed between the first and third sections 5R1 and 5R3, is movable together with a pickup carriage 10. In detail the pickup carriage 10 comprises a stylus 14 therein, and is arranged to slide in the directions of arrows Y1 and Y2, namely in radial directions with respect to the center of the turntable 9 or a disk thereon. The pickup carriage 10 slides along front and rear guide rails 11' and 12 which are parallel to each other, and comprises a side wall 10S on which the second section 5R2 of the right guide rail 5R is disposed. An unshown roller or wheel is rotatably attached to the carriage 10 so that it rotates along the rear guide rail 12. The front guide rail 11' is a cylindrical rod, and is arranged to be telescopically and slidably received in a cylindrical bore made in the carriage 10.

When the disk casing 2 is fully inserted, the front lid 1 of the disk casing 2 is unlocked by an unlocking mechansim 6, and then the disk in the casing 2 is supported at its peripheral portion by a disk supporter 8 while the front lid 1 engages with a front lid supporter 7. The disk casing 2 is then pulled out, under this condition, in a direction of an arrow X2 from the player 3 so that only the disk remains inside the player 3. The disk will be lowered by an elevator 24 associated with the disk supporter 8 so as to be placed on the turntable 9.

Since the pickup carriage 10 is arranged to slide along the rails 11' and 12 by receiving a driving force at only the front portion of the carriage 10, the second section 5R2 of the right guide rail 5R is not necessarily aligned with the first and third sections 5R1 and 5R3. As a result of misalignment, there may be stepped portions between the first and second sections 5R1 and 5R2 and between the second and third sections 5R2 and 5R3. Such stepped portions due to misalignment will cause the opening mechanism 4 to have difficulty in sliding operation which is required for loading and unloading the disk. The misalignment occurs because the carriage 10 is not driven at its center of gravity but is driven at its one end portion. Since the pickup carriage 10 is driven at only the front portion thereof, the driving force is not uniformly applied to the entire carriage 10, and therefore, the front portion is pulled first and then the rear portion follows.

When the pickup carriage 10 is returned to its resting position, as shown in FIG. 1, after being pulled at the front end portion thereof, the carriage 10 will be inclined from desired straight line, and thus the second section 5R2 of the right guide rail 5R is apt to be misaligned with the first and third sections 5R1 and 5R3.

Figure 2:
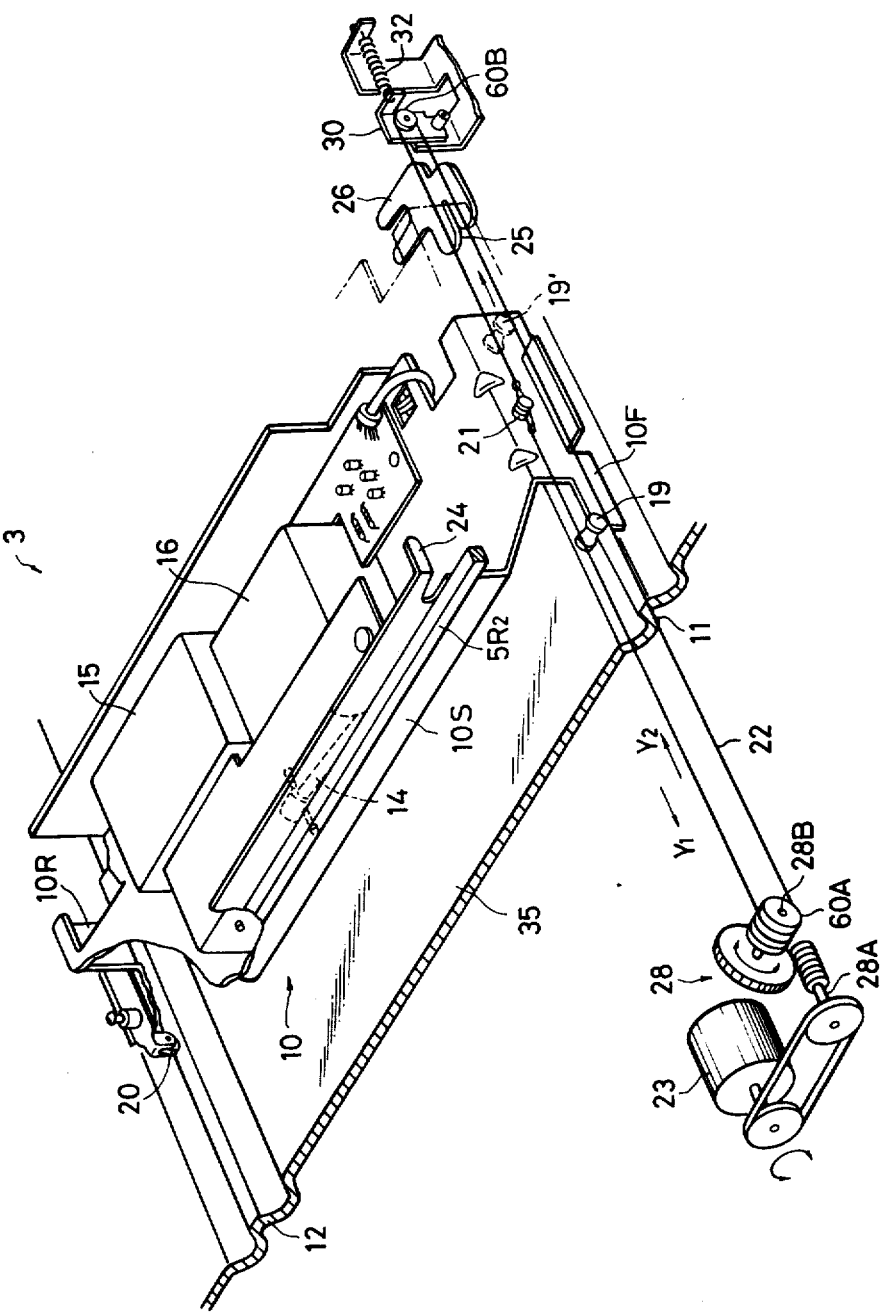
FIG. 2 is a schematic perspective view showing an embodiment of the present invention.

Reference is now made to FIG. 2 which shows a schematic perspective view of an embodiment of the present invention. FIG. 2 shows a partial view of a video disk player used for reproducing video and/or audio information from a recorded disk (not shown) which is rotated in use at a predetermined speed by a turntable (also not shown). The video disk player comprises a chassis 35, and a pickup assembly including a stylus 14, a preamplifier 15, a resonator/oscillator 16, etc. The pickup assembly is mounted on a pickup carriage 10 having a base plate portion 10B, a side wall portion 10S, a front wall portion 10F, and a rear wall portion 10R which are integrally formed.

The side wall portion 10S of the carriage 10 extends upward from the base plate portion 10B, while the front and rear wall portions 10F and 10R both extend downward in the illustration. The side wall portion 10S comprises a bent projection 24 which will be engaged with an unshown switch with which energization of a prime mover for driving the carriage 10 will be terminated when the carriage returns to its resting position. Two guide rollers 19 and 19', which will be referred to as front guide rollers hereafter, are rotatably attached to the front wall portion 10F, while another guide roller 20, which will be referred to as a rear guide roller, is rotatably attached to the rear wall portion 10R in a similar same manner. Each of the front guide rollers 19 and 19' is spool like so that the periphery of the guide rollers 19 and 19' is concaved at its center.

The chassis 35 comprises front and rear guide rails 11 and 12 in the vicinity of its front and rear ends, where the guide rails 11 and 12 are straight and parallel to each other. The front guide rollers 19 and 19' are arranged to be engaged with the front guide rail 11, while the rear guide roller 20 is arranged to be engaged with the rear guide rail 12 so that the guide rollers 19, 19' and 20 rotate along the guide rails 11 and 12 to cause the pickup carriage 10 to move leftward and rightward. Namely, the carriage 10 is capable of performing parallel movement in the radial direction of the unshown turntable. Therefore, the carriage 10 and the stylus 14 mounted thereon can move linearly in the directions of arrows Y1 and Y2 so as to perform linear tracking.

The video disk player further comprises a pickup carriage transporting mechanism having an electrical motor 23, a reduction gear 28, loop-like wire 22 and associated members. In detail, the electrical motor 23 and the reduction gear 28 are both mounted on the chassis 35 in such a manner that the driving force is applied via a belt and pulleys from the motor 23 to the reduction gear 28. The reduction gear 28 has two rotary shafts 28A and 28B. The first shaft 28A is used for receiving the driving force from the motor 23, while the second shaft 28B is used for driving the wire 22.

The wire 22 is made of stainless steel, and both ends thereof are connected to a projection 21 provided on the outer surface of the front wall portion 10F of the pickup carriage 10. The wire 22 is tightened between two pulleys 60A and 60B; the first one 60A being attached to the second shaft 28B of the reduction gear 28, and the second one 60B being rotatably attached to an L-shaped plate 30. The L-shaped plate 30 is rotatably attached to the chassis 35, and is arranged to receive a tensile force from a coil spring 32 connected between the L-shaped plate 30 and the chassis 35. Namely, the coil spring 32 pulls the L-shaped plate 30 in a direction opposite to the pulley 60B so that a give tension is given to the wire 22. The wire 22 is wound around the second pulley 60A of the reduction gear 28 several times as shown, and thus moves when the motor 23 rotates to drive the pickup carriage 10.

If the pickup carriage 10 is driven by the above-described transporting mechanism, it is inevitable that the carriage 10 would be inclined when it is returned to its resting position after being moved because the carriage 10 receives the driving force at other than its center of gravity as described in the above. In accordance with the present invention a correction means is provided to correct such an inclination of the pickup carriage 10. The inclination correction means is illustrated as a stopper 26 made of a plate like member. The stopper 26 is fixedly attached to the chassis 35, and a U-shaped recess 25 is made in the stopper 26. The stopper 26 is positioned so that the portion of the front wall portion 10F of the pickup carriage 10 will be received in the U-shaped recess 25 when the carriage 10 is in its resting position. The width of the U-shaped recess 25 is equal to or slightly greater than the thickness of the front wall portion 10F so that inclination of the carriage 10 will be forcibly corrected by the stopper 26.

The above-described structure of the illustrated embodiment operates as follows. Let us assume that reproduction from an unshown disk has just been finished. As soon as reproduction is over, the motor 23 is either automatically or manually energized to rotate in a given direction. The rotational driving force from the motor 23 is transmitted via the belt and pulleys to the first shaft 28A of the reduction gear 28 so that the pulley 60A fixed to the second shaft 28B rotates. Thus, the wire 22 is driven in the direction of the arrow Y2 to pull the projection 21 fixedly attached to the front wall portion 10F of the pickup carriage 10. As a result, the pickup carriage 10 is driven in the direction of the arrow Y2 to be moved rightward so as to return from its operating position to its resting postion. When the carriage 10 moves rightward, the carriage 10 slightly rotates counterclockwise, centering the rear guide roller 20 when viewed from the top of the player 3. At this time, the front guide rollers 19 and 19' at the front slightly rise in a direction that the guide rollers 19 and 19' tend to disengage from the front guide rail 11. Therefore, the entire carriage 10 inclines so that the side wall portion 10S of the carriage 10 is not normal to the front guide rail 11.

As the carriage 10 moves rightward, the right side of the front wall portion 10F enters into the U-shaped recess 25 of the stopper 26. Since the carriage 10 has been driven at its front wall portion 10F by the wire 22, the front wall portion 10F slightly moves first among the entire carriage 10. Namely, the front wall portion 10F is ahead of the remaining portions, causing an inclination of the entire carriage 10 with respect to its original angle at which the side wall portion 10S is normal to the guide rails 11 and 12.

Because of such an inclination, the front wall portion 10F starts entering into the U-shaped recess 25, having an angle between the longitudinal direction of the front wall portion 10F and the longitudinal direction of the U-shaped recess 25. However, since the width of the U-shaped recess 25 is equal to or slightly greater than the thickness of the front wall portion 10F as described in the above, the inclination of the front wall portion 10F will be corrected as the front wall portion 10F further engages with the U-shaped recess 25. In detail, when the front wall portion 10F is partially received in the U-shaped recess 25, the front and rear surfaces of the front wall portion 10F are both in contact with the right and left inner side walls of the U-shaped recess 25 so that a correcting force is applied to the front wall portion 10F. Thus, the attitude of not only the front wall portion 10F but also the entire carriage 10 are corrected so that the side wall portion 10S is normal to the front guide rail 11, resulting in parallel movement of the carriage 10. Consequently, when the carriage 10 completely returns to its resting position, in which the second section 5R2 of the right guide rail 5R should be aligned with the first and third sections 5R1 and 5R3, the right edge of the front wall portion 10F of the carriage 10 is in contact with the bottom of the U-shaped recess 25, and inclination of the front wall portion 10F is corrected by the U-shaped recess 25. Since the front wall portion 10F is integrally formed with the base plate portion 10B of the carriage 10, the inclination of the entire carriage 10 is also corrected. Accordingly, the second section 5R2 attached to the side wall portion 10S of the carriage 10 is aligned with the first and third sections 5R1 and 5R3, forming a straight guide rail Therefore, the disk casing opening mechanism 4 (see FIG. 1) can smoothly slide on the right and left guide rails 5R and 5L, allowing the disk casing 2 to be inserted smoothly through the front opening of the video disk player 3 to take the disk on the turntable 9 out of the player 3. In the same manner another disk casing may be inserted smoothly into the video disk player 3 to load a disk and, then the casing may be smoothly taken out leaving the disk inside the player 3.

Figure 3:
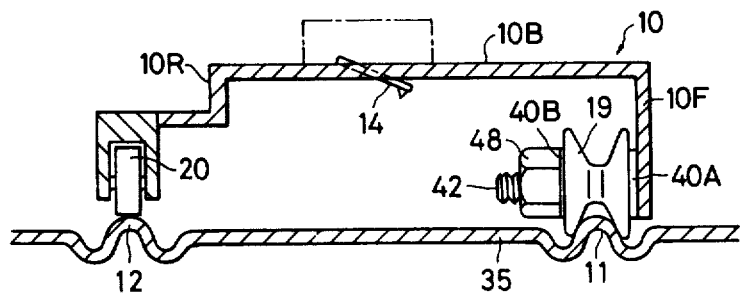
FIG. 3 is a schematic cross-sectional view showing the structure of guide rollers of the pickup carriage transporting mechanism of FIG. 2.

Reference is now made to FIG. 3 which shows the relationship between the guide rollers 19, 19' and 20, and the front and rear guide rails 11 and 12. The periphery of the rear guide roller 20 is not recessed so that the rear guide roller 20 simply rotates on the top portion of the rear guide rail 12. On the other hand, the front guide rollers 19 and 19' have concaved periphery so that both the front guide rollers 19 and 19' are engaged with the front guide rail 11. As best seen in an enlarged cross-sectional view of FIG. 4, each of the front guide rollers 19 and 19' engages with the front guide rail 11, whose cross-section is convexed, in such a manner that the front guide rollers 19 and 19' step over the front guide rail 11. The dimensions of the concaved periphery of the front guide rollers 19 and 19' and of the convexed front guide rail 11 are selected so that each of the front guide rollers 19 and 19' is supported at two points 36A and 36B.

The front guide rollers 19 and 19' are respectively attached to the front wall portion 10F of the carriage 10 as follows. Since the way of supporting the front guide rollers 19 and 19' is identical, description will be made in connection with only one front guide roller 19. A partially threaded pin 42 is fixedly attached to the front wall portion 10F at its head portion so that the pin 42 is normal to the front wall portion 10F. The front guide roller 19 is rotatably supported by the pin 42, which functions as a shaft of the roller 19. In detail, the roller 19 is sandwiched between two washers 40A and 40B, and a nut 48 is engaged with the threaded portion 42T of the pin 42. The nut 48 is made of a synthetic resin such as nylon 66 having elasticity or made of a synthetic resin such as polyacetal added with an elastic material. Namely, a so called engineering plastic nut can be used as the nut 48. The nut 48 has a center hole which is not threaded, where the inner diameter d1 of the center hole is slightly smaller than the minor diameter d2 of the threaded portion 42T of the pin 42. Dot-dash lines indicate the nut 48 which is not yet engaged with the pin 42. The nut 48 will be engaged with the threaded portion 42T of the pin 42 by forcibly fitting the same so that elastic deformation occurs. Namely, on the inner surface of the center hole of the nut 48 is formed a thread as it is engaged with the threaded portion 42T of the pin 42. In other words, the nut 48 is self tapped.

Figure 4:
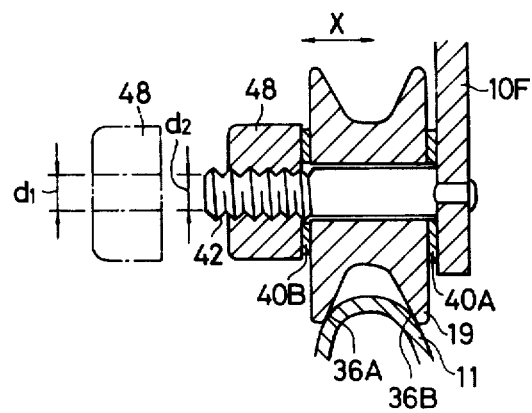
FIG. 4 is a detailed cross-sectional view of the front guide roller shown in FIGS. 2 and 3.
Figure 5:
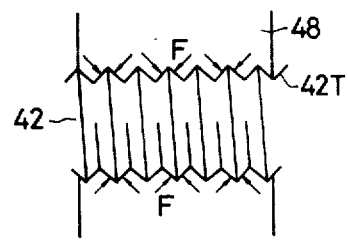
FIG. 5 is an explanatory diagram showing the relationship between the threaded shaft and the nut of FIG. 4.

As a result of such engagement, the nut 48 compresses and tightens the threaded portion 42T of the pin 42 in such a manner that elastic force acts on the entire surface of the threaded portion 42T as indicated by arrows F in FIG. 5 showing a further enlarged view of FIG. 4. Therefore, no play occurs between the nut 48 and the threaded portion 42T. In addition, since the frictional force at the engaging portion between the nut 48 and the threaded portion 42T is very great, the nut 48 is effectively prevented from being loosened.

In order to assemble the above-described various parts to attach the guide roller 19 to the front wall portion 10F, the nut 48 is first tightened until the washer 40A is in contact with the front wall portion 10F by rotating the same in a given direction. Then the nut 48 is loosened a little bit by rotating the same in the opposite direction so that the guide roller 19 can smoothly rotate. With this adjustment, the guide roller 19 has very little play, such as between 10 and 20 micrometers, in the axial direction of the pin 42.

Furthermore, since the guide roller 19 is supported at two points 36A and 36B by the front guide rail 11, the guide roller 19 and the guide rail 11 have play therebetween which is close to zero.

Since the pickup carriage 10 slides on the guide rails 11 and 12 with the rotation of the guide rollers 19, 19' and 20, the carriage 10 is capable of moving smoothly even if the attitude of the carriage 10 slightly deviates from its desired attitude in which the side wall portion 10S is normal to the guide rails 11 and 12. In the above-described arrangement, the washers 40A and 40B may be omitted if unnecessary. Furthermore, the front and rear guide rails 11 and 12 may be provided separately rather than integrally forming with the chassis 35.

Turning back to FIG. 2, it will be realized that the coil spring 32 is provided for pulling the L-shaped member 30 so that the L-shaped member 30 receives a clockwise force. Because of the clockwise force the wire 22 is normally tightened. However, the tensile force by the spring 32 is not sufficient to prevent the wire 22 from being disengaged from the pulley 60A of the reduction gear or from the projection 21 attached to the front wall portion 10F of the carriage 10 as will be described hereafter.

Suppose the carriage 10 moves leftward by the counterclockwise rotation of the pulley 60A. The projection 21 is pulled by the wire 22, and therefore no slack occurs along the wire 22 between the projection 21 and the pulley 60A. However, slack may occur at the remaining portions of the wire 22, and such slack will be absorbed by the spring 32. Then let us assume that the pulley 60A rotates clockwise to move the carriage 10 rightward. In this case, although no slack occurs along the wire 22 between the projection 21 and the right side pulley 60B, and between the right side pulley 60B and the left side pulley 60A, the wire 22 between the pulley 60A and the projection 21 may be loosened. The slack of the wire 22 may result in disengagement of he wire 22 from the pulley 60A or from the projection 21. The following embodiments give improvement for absorbing the slack of the wire 22.

Figure 6:
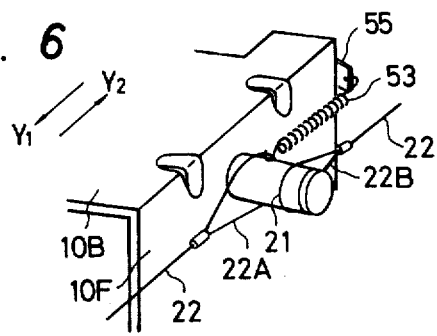
FIG. 6 is a schematic perspective view showing another embodiment of the present invention.
Figure 7:
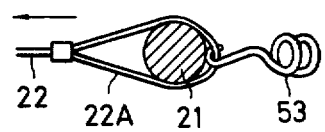
FIGS. 7 and 8 are enlarged cross-sectional views showing the operation of the embodiment of FIG. 6.
Figure 8:
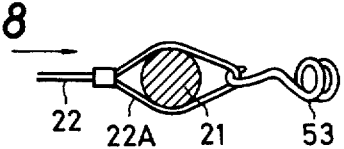

FIG. 6 shows an enlarged perspective view around the front wall portion 10F of the carriage 10. The embodiment of FIG. 6 differs from the structure of FIG. 2 in that an additional coil spring 53 is provided. The coil spring 53 is connected, at its one end, to a projected portion 55 which is located at the right end of the front wall portion 10F, and is further connected to a first end loop 22A of the wire 22. The force of the coil spring 53 is selected so that the first end loop 22A is not pulled by the coil spring 53 when the carriage 10 is not drawn. The operation of the coil spring 53 will be described with reference to FIGS. 7 and 8 which are explanatory enlarged cross-sectional diagrams. When the pulley 60A of the reduction gear 28 (see FIG. 2) rotates counterclockwise, the projection 21 is pulled by the first end loop 22A connected to the loop 22. Therefore, there occurs no slack in connection with the first end loop 22A as shown in FIG. 7. On the other hand, when the puley 60A rotates clockwise, slack will occur at the first end loop 22A because the first end loop 22A is not pulled by the pulley 60A. However, the slack of the wire 22 close to the first end loop 22A will be absorbed by the coil spring 53 as shown in FIG. 8. Namely, the first end loop 22A is pulled rightward by the tensile force of the coil spring 53.

Figure 9:
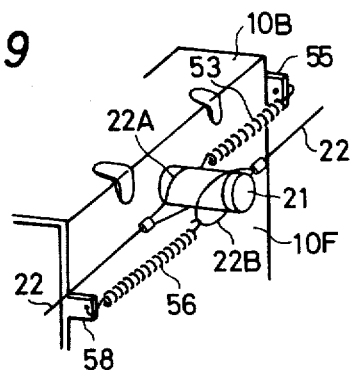
FIG. 9 is a schematic perspective view showing a further embodiment of the present invention.

FIG. 9 shows another embodiment corresponding to a modification of the arangement of FIG. 6. In the modified arrangement of FIG. 9, another coil spring 56 is provided to absorb the slack of the wire 22 which may occur between a second end loop 22B and the right side pulley 60B. The coil spring 56 is attached between the second end loop 22B and a projecting member 58 located at the left end of the front wall portion 10F so as to pull the second end loop 22B leftward when the wire 22 is loosened.

In both the embodiments of FIGS. 6 and 9, the dimensions of the first end loop 22A or the first and second end loops 22A and 22B are selected so that the slack of the wire 22 will be effectively absorbed.

From the foregoing description, it will be understood that the pickup carriage 10 carrying the stylus 14 and associated mechanisms and circuits can be smoothly and accurately driven without suffering from any troubles which have been encounterd in the conventional devices. Especially, the second section 5R2 of the right guide rail 5R for the opening mechanism 4 can be accurately aligned with the first and third sections 5R1 and 5R3 to allow the opening mechanism 4 to move smoothly thereby providing smooth loading and unloading of a disk.

The above-described embodiments are just examples of the present invention, and therefore, it will be apparent for those skilled in the art that many modifications and variations may be made without departing from the spirit of the present invention.

What is claimed is:

1. A pickup carriage transporting mechanism for a disk record player of the type arranged to receive a disk by opening a lid of a disk casing, in which said disk is initially placed, by using an opening mechanism arranged to slide on two parallel guide rails from a front opening of said player to a predetermined positon when said disk casing is inserted into said player, one of said two guide rails having a portion fixedly attached to said carriage, said carriage having a plate-like member which is normally perpendicular to said guide rails, said pickup carriage transporting mechanism comprising:

(a) a first means for moving said carriage in one of opposite directions which are substantially normal to said parallel guide rails, and (b) second means for correcting the attitude of said carriage when said carriage moves toward a predetermined resting position, said second means having a stationary member having a U-shaped recess arranged to be engaged with a plate-like member of said carriage, which plate-like member is substantially normal to said parallel guide rails, said U-shaped recess having a width which is substantially equal to or slightly greater than the thickness of said plate-like member of said carriage, and being arranged so that legs of the U-shape are engageable with opposite sides of said plate-like member, where said legs are normal to said guide rails, so that the attitude of said carriage is corrected such that said guide rail portion attached to said carriage is aligned with one or more stationary remaining members of said guide rail when said carriage is at said predetermined resting position.

2. A pickup carriage transporting mechanism as claimed in claim 1, wherein said plate like member is a portion of a front wall of said carriage, which front wall portion is substantially normal to the chassis of said disk record player.

3. A pickup carriage transporting mechanism as claimed in claim 2, wherein said plate like member is fixedly attached to said carriage of said disk record player.

4. A pickup carriage transporting mechanism as claimed in claim 1, wherein said first means comprises stationary front and rear guide rails, a pair of front guide rollers rotatably attached to the front portion of said carriage, and a rear guide roller rotatable attached to the rear portion of said carriage.

5. A pickup carriage transporting mechanism as claimed in claim 4, wherein said first means comprises an electrical motor, a reduction gear arranged to receive a rotational force from said electrical motor, and a loop-like wire connected to said carriage, said loop-like wire being wound around a pulley of said reduction gear at one side of the loop, and further being wound around another pulley at the other side of said loop.

6. A pickup carriage transporting mechanism as claimed in claim 5, further comprising means for giving a tensile force to said pulley at the other side of said loop so that the slack of said wire will be absorbed.

7. A pickup carriage transporting mechanism as claimed in claim 6, wherein said means for giving said tensile force comprises a rotatably mounted member carrying said pulley at the other side, and means for biasing said rotatably mounted member in a given direction.

8. A pickup carriage transporting mechanism as claimed in claim 7, wherein the biasing means is a coil spring interposed between a stationary member and said rotatably mounted member.

9. A pickup carriage transporting mechanism as claimed in claim 4, wherein each of said front guide rollers is rotatably attached to the front wall portion of said carriage by means of a shaft having a threaded portion and a nut made of a synthetic resin so that said nut can be fixedly engaged with said threaded portion of said shaft with elastic deformation.

10. A pickup carriage transporting mechanism as claimed in claim 9, wherein said nut has a center hole whose inner diameter is smaller than the minor diameter of said threaded portion of said shaft.

11. A pickup carriage transporting mechanism as claimed in claim 10, wherein said synthetic resin is nylon 66.

12. A pickup carriage transporting mechanism as claimed in claim 10, wherein said synthetic resin is polyacetal.

13. A pickup carriage transporting mechanism as claimed in claim 4, wherein each of said front guide rollers has a concaved periphery, and wherein said front guide rail has a convexed cross-section to be engaged with said concaved periphery of said front guide rollers.

14. A pickup carriage transporting mechanism as claimed in claim 13, wherein the dimensions of said concaved periphery and said convexed cross-section are selected so that each of said front guide rollers is supported at two points on said front guide rail.

* * * * *